United States Patent [19]

Fisher

[11] 3,895,783
[45] July 22, 1975

[54] COOLING ASSEMBLY FOR STEEL CONVERTER VESSELS

[75] Inventor: Howard M. Fisher, New Castle, Pa.

[73] Assignee: Pennsylvania Engineering Corporation, Pittsburgh, Pa.

[22] Filed: Oct. 21, 1974

[21] Appl. No.: 516,272

Related U.S. Application Data

[63] Continuation of Ser. No. 400,268, Sept. 24, 1973, abandoned.

[52] U.S. Cl. ................................................ 266/35
[51] Int. Cl. ............................................. C21c 5/42
[58] Field of Search .............................. 266/34–36

[56] References Cited
UNITED STATES PATENTS
3,304,075  2/1967  Puxkandl............................ 266/36 P Primary Examiner—Gerald A. Dost
Attorney, Agent, or Firm—Fred Wiviott

[57] ABSTRACT

Apparatus for cooling the mouth region of a steel converter vessel which may be of either the oxygen lance or tuyere injection type includes a lip ring assembly composed of arcuate segments situated near the mouth of the vessel which segments contain internal ducts. The duct employed in each segment is preferably of a serpentine configuration. A plurality of external parallel pipes may also be provided below the vessel mouth to cool the area between the mouth and the converter trunnion support ring. Suitable conduits are provided for supplying a cooling fluid to both the lip ring segments and the parallel pipes. The coolant drained from the segments and pipes is directed to the trunnion ring for cooling it.

5 Claims, 6 Drawing Figures

COOLING ASSEMBLY FOR STEEL CONVERTER VESSELS

This is a continuation of application Ser. No. 400,268, filed Sept. 24, 1973 and now abandoned.

BACKGROUND OF THE INVENTION

This invention relates to vessels for converting impure molten iron to steel. There are two basic converter vessel types for steel refining with oxygen. Both are open-topped circular vessels which are similar except that tuyeres are provided at the bottom of one type for injection of gases and particulate materials below the molten metal bath, while in the other, oxygen is injected with a lance inserted through the mouth of the vessel. Blowing oxygen into either type of vessel during the main refining cycle results in generation of much heat, and the converter vessels and their refractory linings are therefore subjected to tremendous thermal stress. Thermal stresses are particularly pronounced at the vessel mid-section which usually is surrounded by a heavy metal support ring having laterally extending trunnion pins which are journaled in stationary supports. The ring and pins allow the vessel to be tilted for charging, slag removal, steel pouring, oxygen lance injection and other procedures. Due to the great weight of the converter vessel and the heat shielding characteristics of the heavy trunnion ring, temperature variations are considerable between the areas above and below the ring and the area immediately under the ring.

Another frequently encountered problem in the use of these vessels is the tendency for molten metal to accumulate near the vessel mouth during refining, the accumulations being caused by spattering or spitting. This is known as "skull buildup" since metal spattered to the upper regions of the vessel often solidifies there.

A proposed solution to the problems of high thermal stress and skull buildup is to locate a cooling device in the upper area or nose of the vessel. Cooling the vessel decreases thermal stress therein and also reduces skull buildup since molten metal contacting a cooler surface will tend to bead and drop back into the melt within the vessel. Prior art attempts to cool such vessels have involved large, heavy and expensive hollow ring-shaped elements supplied with coolant and surrounding the mouth of the converter vessel. These elements, it has been found, deteriorate rather quickly. Frequently taking the vessel out of service for their replacement can result in serious economic losses. In addition, a single cooling element cannot overcome the thermal stress problem in the vicinity of the trunnion ring. Most prior art attempts at cooling the lip of a converter used a single cooling ring whose replacement was both difficult and expensive since the lip ring may weigh several thousand pounds. Finally, some prior art cooling rings use one wall of the furnace or vessel as part of the cooling chamber. These rings are disadvantageous since burn-out of that portion of the vessel would result in large amounts of water being dumped into the melt. In any event, the melt would be ruined, and it is possible that the entire refractory lining of the furnace could be severely damaged.

SUMMARY OF THE INVENTION

A primary object of this invention is to provide a cooling system for metallurgical refining vessels which can inhibit the damaging effects of thermal stress and aid in the prevention of skull buildup.

It is another object of this invention to provide a cooling system for metallurgical vessels which includes a multi-section lip ring the use of which enables replacement of only that portion of the ring which may have deteriorated and results in reduced vessel downtime.

Yet another object of the invention is to provide a cooling system for metallurgical refining vessels which reduces the effects of thermal stress both at the lip of the vessel and in the area between the lip and the trunnion ring.

Still another object of this invention is to provide a cooling system for metallurgical refining vessels which includes separate systems for cooling the lip of the vessel and for cooling the area below the lip and above the trunnion ring.

How the foregoing and additional objects of the invention are achieved will become apparent from the following description of certain preferred embodiments taken in conjunction with the drawings. In general however, the invention comprises supplying coolant to a metallurgical vessel through one of the trunnion ring support pins which coolant is distributed by suitable pipes to individual arcuate segments which together form the novel lip cooling ring of the invention. Coolant from the lip ring is then returned to the plane of the trunnion ring where it cools the trunnion ring before being exhausted through either the same or the opposite trunnion ring support pin. The invention may also comprise the use of parallel half-pipes in the upper area of the vessel which together with the segmental lip ring assembly cools a greater area. The half-pipes may be supplied by a header and the coolant drained from the half-pipes may join the coolant drained from the segmental lip ring assembly for use in cooling the trunnion ring. The novel lip ring segments may either have a large capacity channel or a serpentine pipe cast within them for conducting coolant water. Each of these designs is able to furnish large surface area cooling and structural benefits over the types used in the prior art. An additional feature of the invention is that the water flow paths are designed to minimize the distance through which the coolant must pass in the heated areas of the furnace, thereby keeping the water temperature more uniform throughout the vessel cooling system. This further reduces and equilizes thermal stress. For example, by reducing the temperature to 300° C in a dry ring to 30°–40° C in a water cooled ring, the thermal stress can be reduced from about 30,000 lbs. per sq. inch to approximately 7,500 lbs. per sq. inch.

DESCRIPTION OF PREFERRED EMBODIMENTS

Figure 1:
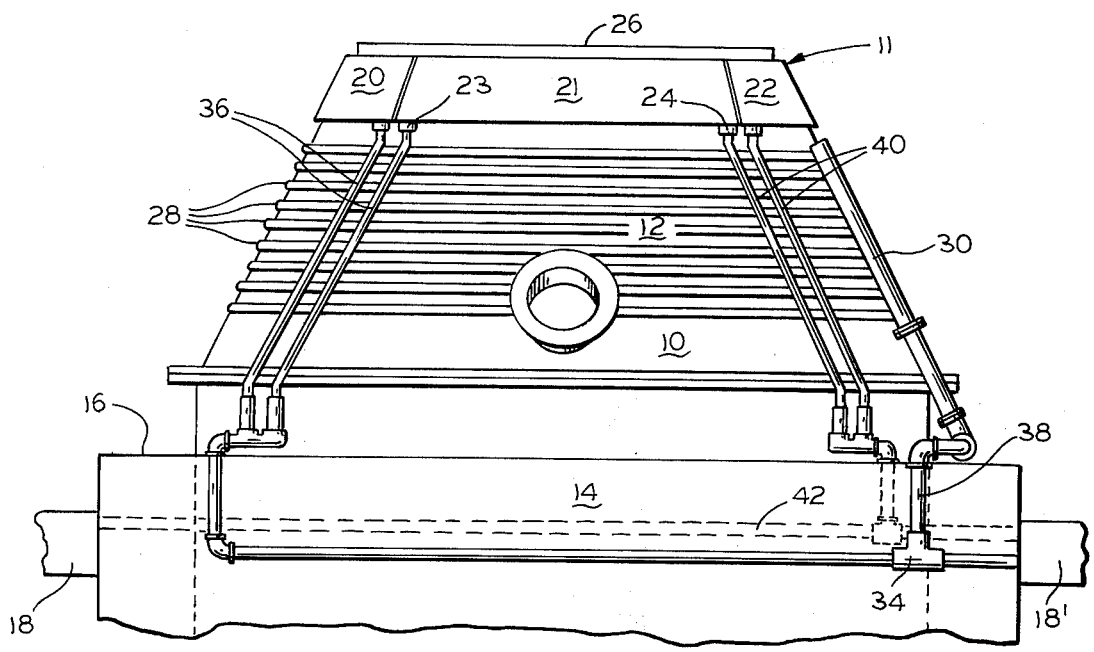
FIG. 1 is an elevation view of the upper portion of a converter vessel including the new cooling apparatus of the invention.
Figure 2:
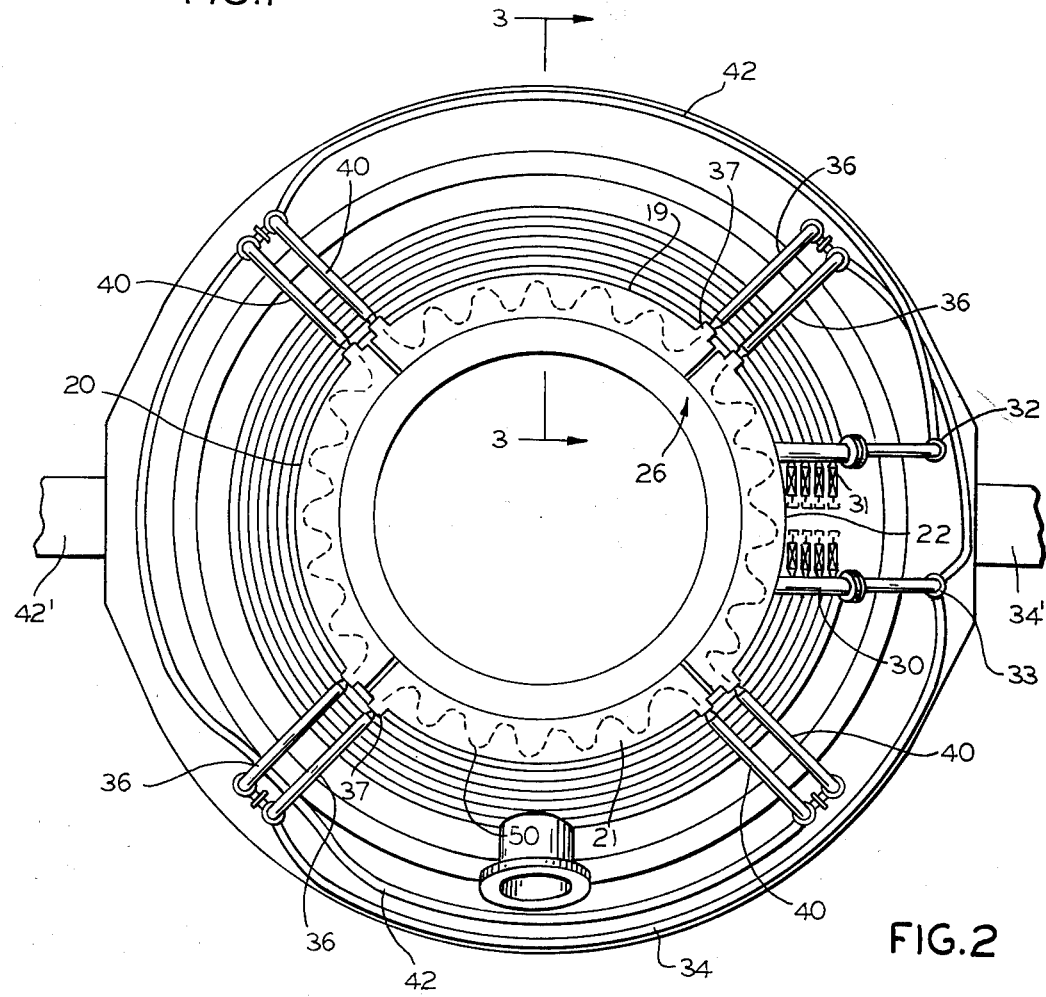
FIG. 2 is a top plan view of the vessel and cooling assembly shown in FIG. 1.

FIGS. 1 and 2 show separate views of one embodiment of the invention including both a vessel lip cooling ring 11 and parallel pipe cooling means 28 for the upper portion 12 of a generally round metallurgical refining vessel 10. At the upper portion of the vessel 10 is a generally converging or conical portion 12 leading to the vessel mouth while the lower portion 14 of FIG. 1 illustrates the main body of furnace 10. The lower portion of the vessel is broken away since the vessel itself is a known type. The vessel bottom may be imperforate refractory if gases are injected through the vessel mouth with a lance not shown. Tuyeres, also not shown, may be installed in the vessel bottom if gases and particulate materials are injected from the bottom. In either case, a trunnion ring 16 is used to support the vessel to enable tilting it for slag removal, charging, hot melt pouring, and other procedures. In addition, trunnion support pins 18 and 18' are used to journal the vessel and support the trunnion ring on suitable support means (not shown) which may be of any type known generally to the art.

The lip ring 11 at the top region of the furnace 10 includes four substantially equal segments 19–22 which may be cast metal containing ducts for directing cooling fluid through the vessel lip. Extending above the lip cooling ring is a generally toroidal member 26 which may be bolted onto segments 19–22 to protect them from physical damage incidental to vessel charging or deslagging operations. Toroidal member 26 is made of metal, is easily replaced and may be considered disposable since it serves primarily to protect segments 19–22.

As shown in FIG. 2 each segment 19–22 includes a duct system for conducting cooling fluid from the inlet 23 of each segment to the outlet 24. Duct 50 in FIG. 2 has a serpentine or tortuous configuration which is further illustrated by cross-section of a segment in FIG. 3. As an alternative embodiment, the duct may have a large volume cross-section such as is shown in FIG. 4 and may be arcuate rather than serpentine.

In addition to the lip cooling segments 19–22, the embodiment shown by FIG. 1 includes parallel half-pipes 28 encircling and substantially covering the upper portion 12 of vessel 10. FIG. 1 illustrates nine such pipes 28, but any number may be used depending on the requirements of the particular vessel and the shape of pipes 28 is not critical as long as an adequate cooling surface is in heat exchange relationship with the converter vessel. The half-pipes 28 are supplied jointly from a feed header 30 and connect with a drain header 31 which, as seen in FIG. 2, is adjacent the feed header 30. Feed header 30 for the half-pipes connects by means of flexible pipe member 33 to a supply pipe 34 which is shown to enter the trunnion ring 14 through the drive side support pin 18' as conduit 34'. In addition to supplying header 30 this supply 34 also feeds four pipes 36 for admitting cooling fluid to each of the inlets 23 of segments 19–22. The drain pipes 40 from the outlets 24 of each of these four segments connect to a drain 42 which completely encircles the trunnion ring and, in addition, coolant from pipes 40 is fed from outlet header 31 through a flexible connection 32. The drain outlet from the vessel is through pipe 42' illustrated as passing through idler support pin 18. Pipes 34' and 42' may be considerably larger than the other pipes because they must supply numerous different pipes within the vessel structure. For example, for cooling a large vessel, inlet 34' and outlet 42' may be 6-inch pipes while the half-pipes 28, feed pipes 36 and drain pipes 40 may be two and one-half inch pipes. The inlet 30 and outlet 31 headers for example, might then be 5 inch pipes.

Figure 3:
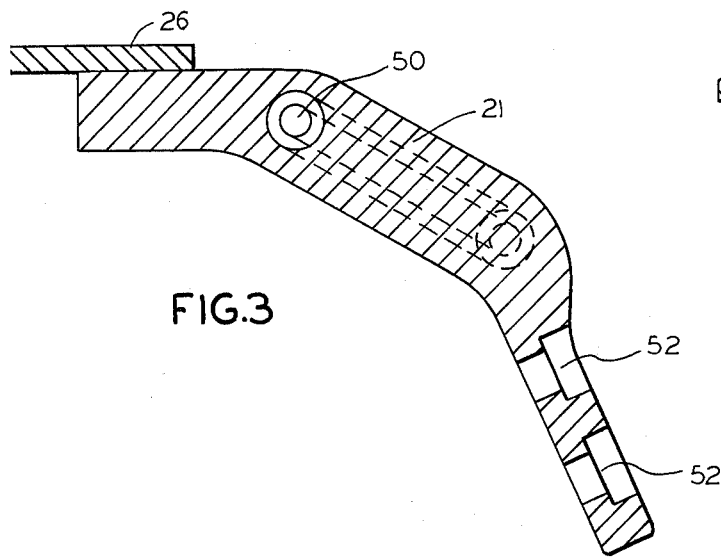
FIG. 3 is a cross-sectional view of an arcuate lip segment taken along line 3—3 of FIG. 2.
Figure 4:
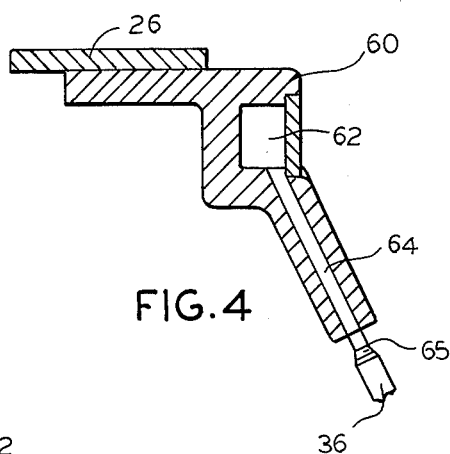
FIG. 4 is a cross-sectional view of a lip cooling segment, according to an alternative embodiment of the invention, illustrating a large water volume pipe in place of the serpentine pipe arrangement.

Cross-sections of two embodiments of the lip cooling segments 19–22 are shown in FIGS. 3 and 4. Each drawing shows the toroid or ring 26 which is bolted onto the members 21 (illustrative segment of FIG. 1) and 60 (an alternate embodiment of FIG. 2). The bolting means for attaching the toroidal ring 26 to the arcuate segments is not shown, but attachment can be accomplished in any convenient manner such as with machine screws.

FIG. 3 is a view taken along line 3—3 of FIG. 2. It shows that duct 50 has a serpentine configuration and the segment 21 itself may be bolted through holes 52 to the upper portion of the furnace. An important feature of this arrangement is that in case of burnout of a lip cooling segment 21, water will not enter the molten metal bath in the vessel but will instead flow down the side thereof and evaporate as steam.

FIG. 4 shows an alternate embodiment where, instead of the serpentine duct, a large cross-sectional area duct 62 is formed inside each of the segments 60. The sectional view of FIG. 4 is taken through the inlet end of a segment and shows feed pipe 36 connected by means of coupling 65 and pipe 64 to the interior of duct 62.

Figure 5:
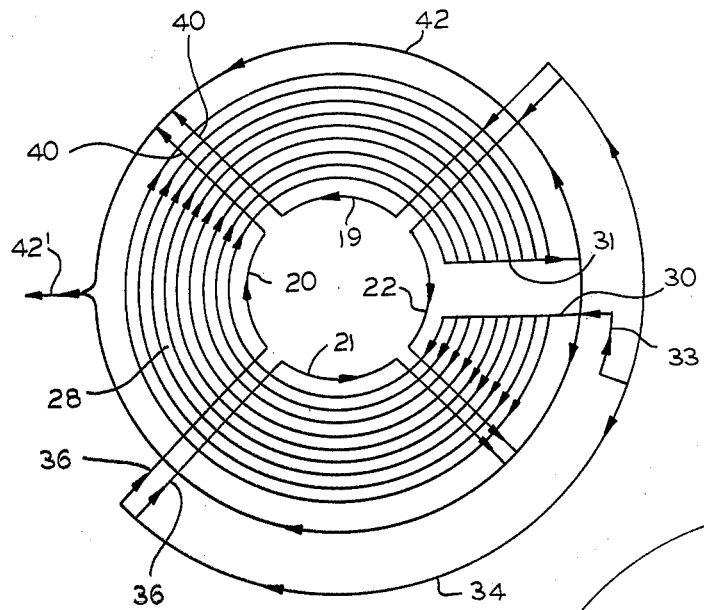
FIG. 5 is a diagrammatic view illustrating one of several possible cooling fluid paths in a vessel cooling system which uses four similar lip ring segments.

Although, FIGS. 1–4 have been described in conjunction with four equal arcuate segments 19–22 for containing a coolant duct 50, other arrangements can be employed using more or fewer individual segments. An advantage of using multiple segments is that the internal coolant ducts can be shorter between the segment inlet and outlet in which case the temperature differential between the vessel and the segments can be large along the entire way so that heat transfer, which depends on temperature differential, is enhanced. If there were a continuous duct around the vessel, or even if there were two parallel paths half way around, there would be a large temperature differential near the coolant inlet but the coolant would become exceedingly hot before reaching an outlet and thereby reduce heat transfer undesirably. This not only results in inefficient cooling but may also set up uneven thermal stresses in the vessel. FIG. 5 illustrates one manner of achieving this object. It can be seen that instead of having feed pipe 34 completely encircle the vessel, it only extends through an arc of 180° and, by the arrangement shown, supplies all four segment feed pipes 36. Instead of locating feeds every 90°, feeds and drains, respectively, constitute adjacent pairs and the pairs are separated by 180°. The drains are shown to connect to main drain 42 which does completely encircle the vessel and provides the desired cooling for the trunnion ring itself. Flow is also shown through the half-pipe arrangements and feed and drain headers 30 and 31.

Figure 6:
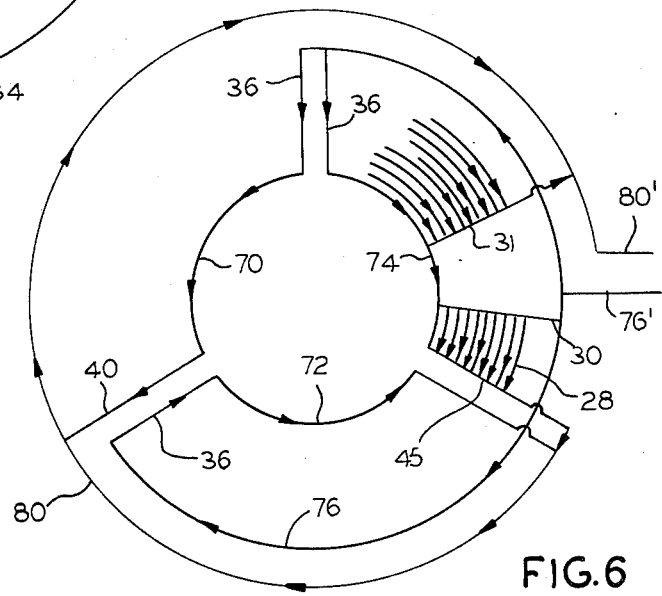
FIG. 6 shows a modification of the fluid flow paths in a system which uses three lip ring segments.

FIG. 6 illustrates an alternate embodiment of the invention wherein only three lip segments 70, 72, and 74 are used instead of four as in the previously discussed embodiment. These segments may contain either the serpentine or high volume ducts as described in connection with FIGS. 1–5. Also, as mentioned above, the half-pipe arrangement may be used with three lip ring segments. By using this arrangement, the three segments and the arrangement for feed and drain as shown by the drawing, water flow may again be utilized to the optimum to allow for most efficient cooling of the lip of the vessel while at the same time decreasing stress effects in the trunnion ring area. The inlet 76' and the outlet 80' are shown located on the same side of the vessel, which may be either the idler pin or drive pin side. It is apparent that drain 80' may be located at the opposite side of the vessel merely by shortening conduit 80 which receives the drain from pipes 40 and outlet header connection 34.

The specific embodiments described in connection with FIGS. 1–6 are merely illustrative of the half-piping system and the arcuate segmented cooling lip members. Different numbers of segments and various numbers of cooling pipes may be used to prevent skull buildup and avoid markedly uneven thermal stresses. Skull buildup is directly proportional to the area which is cooled in the upper regions of the vessel and most critical problems occur directly around the lip. However, in some instances, cooler surfaces are desired nearly everywhere above the slag level and for these cases the numbers and sizes of the half-pipes will be determined by the heat to be transferred. In addition, suitable valves may be employed at each pipe feed connection to adjust the flow rates through the segments and the half-pipes. If gradually decreasing cooling is desired from the top of the vessel to the trunnion ring the valves could adjust the flow for each half-pipe and for the feed pipes 36 accordingly.

Although specific embodiments of the invention have been described in considerable detail it is to be understood that such description is intended to be illustrative rather than limiting, for the invention may be variously embodied and is to be limited only by construing the claims which follow:

I claim:

1. A metallurgical converter vessel having an opening in the upper end thereof for receiving and discharging metal, a plurality of metallic segments each separately releasably securable to the outer surface of said vessel and in surrounding relation to said opening, said segments forming a generally annular heat exchanger with the upper outside surface of said vessel, each of said segments including a generally hollow elongate body portion having a cooling fluid inlet and a cooling fluid outlet disposed on substantially the opposite ends thereof and in fluid communication with said hollow interior, said segments each having an inner surface of one of its larger dimensional sides generally conforming to a portion of the outer surface of said vessel, each of said segments also including a pair of elongate flange portions each extending along one of the lateral sides of said body portion and also extending in general conformity with an adjacent outer portion of said vessel, one of said flange portions extending downwardly from said body portion and being secured to the side of said vessel for releasably securing said segments to said vessel with said inner surface thereof in heat exchange relation with the surface of said vessel for cooling and supplying mechanical support for the open end of said vessel, the other of said flange portions extending inwardly toward said opening, and ring means secured to and joining the other of said flange portions.

2. The combination set forth in claim 1 wherein said ring means comprises a metallic member disposed in concentric surrounding relation to said opening, said ring and said segments covering the upper end of said vessel and the margins of said opening.

3. The combination set forth in claim 2 wherein the body portion of each of said segments is generally homogeneous and said hollow portion comprises a generally narrow, continuously curvate serpentine void formed therein.

4. The combination set forth in claim 2 and including a plurality of pipes engaging said vessel in a spaced apart, generally parallel arrangement, said pipes extending substantially around said vessel and being disposed between said segments and said trunnion ring, supply header means coupled to one end of each of said pipes and being coupled to said first cooling fluid passage for receiving said cooling fluid in parallel relation to said segments, said pipes also including a discharge header connected to the opposite end of said pipes and to said cooling fluid passageway to discharge cooling fluid from said pipes into said trunnion ring for passage therethrough prior to discharge.

5. The combination set forth in claim 1 wherein said vessel includes a trunnion ring coupled to said vessel for supporting the same and a pair of generally oppositely extending trunnion pins adapted to be supported whereby said vessel may be tilted about the axis of said trunnion pins, said trunnion ring having a cooling fluid passageway provided therein and extending generally around said vessel, at least one of said trunnion pins having a first cooling fluid passage formed therein, first conduit means coupling each of the inlets of said segments to said first fluid passage means, second conduit means connecting the outlets of each of said segments to said cooling fluid passageway, a second cooling passage provided in one of said trunnion pins and being connected to said cooling fluid passageway for receiving discharging cooling fluid from said passageway so that said cooling fluid passes through said segments prior to passage through said trunnion ring.

\* \* \* \* \*